United States Patent [19]

Yamato et al.

[11] Patent Number: 4,718,961
[45] Date of Patent: Jan. 12, 1988

[54] METHOD AND DEVICE FOR THE FABRICATION OF PLASTIC SLEEVES

[75] Inventors: Yoshihiro Yamato; Masayuki Takasaka; Takeshi Sasaki, all of Yokohama; Masatoshi Kishida, Noda, all of Japan

[73] Assignee: Toyo Garasu Kabushiki Kaisha, Tokyo, Japan

[21] Appl. No.: 857,485

[22] Filed: Apr. 30, 1986

[30] Foreign Application Priority Data

Apr. 30, 1985 [JP] Japan .................. 60-91140

[51] Int. Cl.$^4$ .................. B32B 31/00; B29C 53/42
[52] U.S. Cl. .................. 156/218; 156/86; 156/247; 156/285; 156/344; 156/447; 156/494; 156/584
[58] Field of Search .................. 156/247, 218, 344, 86, 156/447, 494, 584, 285, 308.4, 497; 425/438

[56] References Cited

U.S. PATENT DOCUMENTS

| | | | |
|---|---|---|---|
| 4,199,851 | 4/1980 | Doherty | 156/218 |
| 4,365,460 | 12/1982 | Cress | 156/86 |
| 4,496,409 | 1/1985 | Kontz | 156/447 |

Primary Examiner—Donald E. Czaja
Assistant Examiner—J. Davis
Attorney, Agent, or Firm—Wenderoth, Lind & Ponack

[57] ABSTRACT

In the fabrication of a plastic sleeve by heat sealing overlapped ends of a plastic film blank wrapped around a mandrel, a part of the underlying overlapped end is often melted inadvertently and adheres to the mandrel, obstructing easy stripping of the sleeve off the mandrel. Accordingly, a tensioning groove is formed in the mandrel surface, and a pressing-in bar is pressed thereinto over the sleeve while a part of the sleeve is held stationary against the mandrel by a holding plate to pull the sleeve part thus adhering sidewise in the peripheral direction of the mandrel and thereby to peel away and free the same.

3 Claims, 4 Drawing Figures

METHOD AND DEVICE FOR THE FABRICATION OF PLASTIC SLEEVES

BACKGROUND OF THE INVENTION

This invention relates generally to methods and apparatuses for fabricating plastic sleeves and more particularly to a method and device in which a blank of plastic film is wrapped around the cylindrical outer surface of each of a plurality of cylindrical mandrels of a unique design of a turret assembly, the ends of the blank being overlapped. The overlapped ends are fused by heat sealing thereby to form a plastic sleeve, and this sleeve is easily slipped off the mandrel.

Recently, there has appeared the practice of fitting a sleeve of a plastic film with a decorative pattern applied beforehand thereon onto the outer surface of a glass bottle and placing this glass bottle thus covered with the sleeve in a heating oven thereby to cause the film to undergo heat shrinkage and thereby to adhere tightly to the surface of the glass bottle. In the fabrication of the above described sleeve of plastic film, a blank of the plastic film is wrapped around the cylindrical outer surface of a cylindrical mandrel, the wrapping length of the blank being sufficient to cause its ends to be overlapped when the blank is thus wrapped, and the end edge parts thus overlapped are fused by heat sealing. The sleeve of the plastic film thus formed is stripped or caused to slide off the mandrel for removal therefrom and is then fitted onto a glass bottle and caused to adhere tightly thereto by the above mentioned heat shrinkage process step.

However, in the step of removing the plastic film sleeve from a conventional mandrel and fitting the sleeve onto a glass bottle, there have heretofore been frequent cases wherein the plastic sleeve could not be easily removed from the mandrel. While various reasons for this difficulty are conceivable, the principal causes appear to be that the gap between the plastic sleeve and the mandrel is small, whereby the frictional force resisting removal is large and that, at the time of fusing by heat sealing, the overlapped part of the plastic sleeve melts and adheres to the outer peripheral surface of the mandrel.

SUMMARY OF THE INVENTION

It is an object of this invention to provide a method of fabricating plastic sleeves in which each plastic sleeve formed by fusing by heat sealing the overlapped ends of a plastic film blank wrapped around a mandrel is easily removed from the mandrel.

Another object of the invention is to provide a device for fabricating sleeves which includes at least one mandrel on which a plastic sleeve is formed by heat sealing the overlapped ends of a plastic film blank wrapped around the mandrel, and from each of which the plastic sleeve thus formed can be easily removed.

According to this invention in one aspect thereof, briefly summarized, there is provided a method of fabricating plastic sleeves which comprises: cutting a long web of plastic film into blanks of specific length; wrapping each blank around the cylindrical outer surface of a respective mandrel having a tensioning groove formed in the cylindrical outer surface thereof and extending parallelly to the cylindrical axis thereof, said tensioning groove having a cross-sectional profile of a total length which is longer than the length of the cross-sectional profile of said cylindrical outer surface extended across the tensioning groove, said specific length being such that the ends of the blank thus wrapped mutually overlap to form an overlap; applying a vacuum to the inner surface of the blank thus wrapped thereby to draw the blank tightly against the mandrel; pressing a welder seam bar against said overlap thereby to heat seal the same to form a seam and thereby to form a plastic sleeve; vitiating the vacuum; pressing and holding stationary a part of the sleeve against the cylindrical outer surface of the mandrel by means of a holding plate; simultaneously pressing the sleeve into the tensioning groove by means of a pressing-in bar thereby to pull the sleeve sidewise and peel away from the mandrel surface any part of the overlap which has melted and is adhering to the mandrel surface; and stripping the sleeve off the mandrel.

According to this invention in another aspect thereof, briefly summarized, there is provided a device for fabricating plastic sleeves, comprising: a mandrel body having a hollow interior and a cylindrical outer surface with a plurality of through holes communicating said interior and the atmosphere outside said surface for supporting a plastic film blank wrapped therearound with overlapped ends, said mandrel body having a tensioning groove formed in said outer surface parallelly to the cylindrical axis of the mandrel body and having a cross-sectional profile of a total length which is longer than the length of the cross-sectional profile of said cylindrical surface extended across said tensioning groove; means for applying a vacuum to said interior to draw said blank tightly against said outer surface by suction through said holes during bonding together of said overlapped ends and for vitiating the vacuum thereafter; bonding means for bonding together said overlapped ends of said blank thus supported on the mandrel to form a seam therealong and thereby form a plastic sleeve; a holding plate for pressing and holding stationary a part of said sleeve thus formed against the mandrel body at a part thereof on one side of the holding groove remote from said sealing means; a pressing-in bar movable, with the sleeve thus held by said holding plate, into said tensioning groove over the sleeve at the portion thereof spanning the tensioning groove to draw the sleeve sidewise in the circumferential direction of the mandrel body and thereby to peel and free any portion of said overlapped ends which has been caused by the bonding thereof to adhere to the mandrel body; and stripping means for stripping the sleeve thus formed and freed off the mandrel body.

The nature, utility, and further features of this invention will be more clearly apparent from the following detailed description when read in conjunction with the accompanying drawings, in which like parts are designated by like reference numerals, and which are briefly described below.

DETAILED DESCRIPTION OF THE INVENTION

Figure 1:
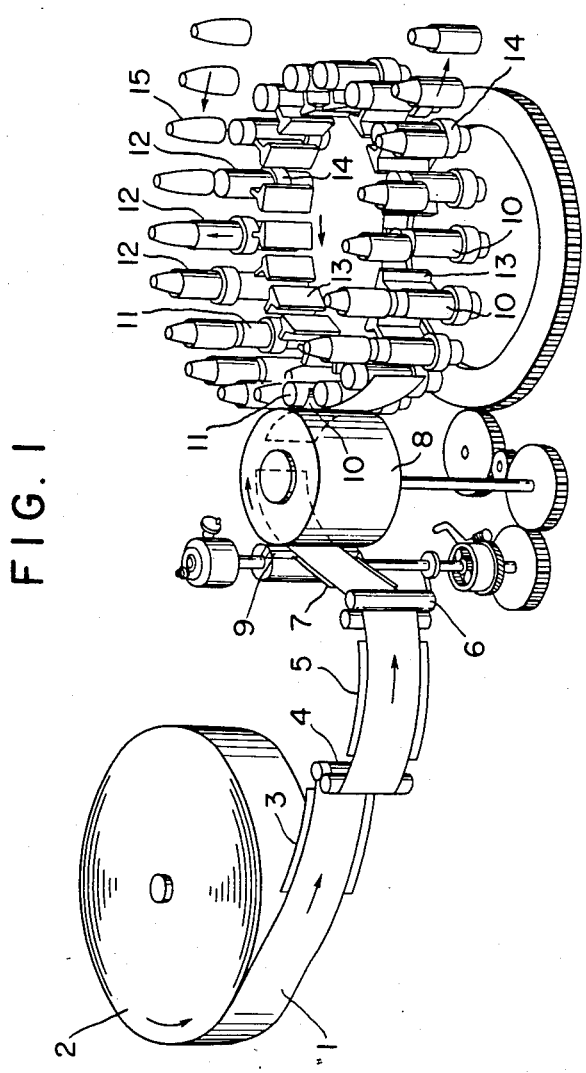
FIG. 1 is a perspective view showing the essential parts of an apparatus for fabricating plastic sleeves and fitting the same on respective glass bottles, in which apparatus the device for fabricating plastic sleeves according to this invention is incorporated.

Referring to FIG. 1, the plastic film for forming the plastic sleeves is in the form of a web stock material 1 fed from a web roll 2. This web stock material 1 is a thermoplastic film of a resin such as polystyrene or polyethylene. Upon being paid out from the web roll 2, this stock material 1 is guided successively by a first web guide 3, an S-guide 4, and a second web guide 5 and is supplied to feed rolls 6. The web stock material 1 thereby drawn out by the feed rolls 6 is guided by a third web guide 7 and thus fed to the cylindrical surface of a transfer drum 8 having a vacuum suction action. The web stock material 1 is fed further in a state of momentary adhesion to the cylindrical surface of the transfer drum 8 due to the vacuum suction action of the drum, and, at an intermediate point, one section of the leading portion of the web 1 having a specific length is cut off by revolving knife 9 and thus formed into a blank 10. This revolving knife 9, of course, is adapted to revolve synchronously with the rotation of the transfer drum 8.

Then, at a point in the vicinity of one of a plurality of vertical mandrels 11 disposed on a common circle on and around a turret, the leading end of the blank 10 is tranferred onto this mandrel 11 by a blast of air ejected from the transfer drum 8. This blank 10 is then subjected to a vacuum suction action and adheres to the cylindrical surface of the rotating mandrel 11. Then, as the mandrel 11 rotates, the blank 10 is wound into a hollow cylindrical shape around the cylindrical surface of the mandrel and is thus formed into a sleeve 12.

At this time, the trailing end of the blank 10 is overlapped over the leading end thereof, whereby an overlap is formed. The rotation of the mandrel 11 about its own axis is stopped at an angular position of the mandrel where this overlap of the sleeve 12 is facing inward directly toward the rotational axis of the turret. Thereafter, the mandrel 11 moves along a circular path in accordance with the rotation of the turret. Then, when the mandrel 11 arrives at a specific station, a welder seam bar 13 is pressed against the above described overlap of the sleeve 12 disposed around the mandrel 11. Then, after the welder seam bar 13 has been drawn back, the vacuum suction action of the mandrel 11 is terminated.

The turret continues to rotate until the weld seam bar 13 retracts, and the plastic sleeve 12 is forced to fit around a glass bottle 15 from its bottom by a stripper ring 14 as the mandrel 11 rotates. In the past, however, at the time of heat sealing fusion with the heat seal bar 13, the plastic film has melted and has often adhered to the peripheral surface of the mandrel 11, whereby the smooth pulling off of the plastic sleeve 12 from the mandrel 11 has been obstructed. Accordingly, in accordance with this invention, a tensioning groove is formed in the outer surface of the mandrel 11 itself, and a portion of the formed plastic sleeve 12 is pressed into this tensioning groove to pull the sleeve 12 sidewise in the circumferential direction of the mandrel 11 and thereby to peel and free any part of the plastic sleeve 12 which has melted and is adhering to the mandrel surface.

The construction and operation of an example of the mandrel 11 constituting an essential feature of this invention will now be described with referene to FIGS. 2 through 4.

Figure 2:
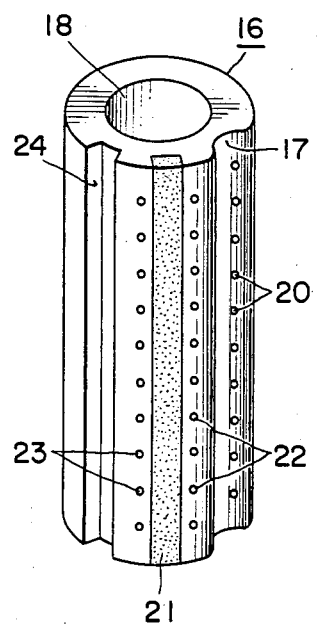
FIG. 2 is a perspective view of a mandrel constituting an essential part of the device for fabricating plastic sleeves according to the invention.

Referring first to FIG. 2, the mandrel shown therein has a mandrel body 16 having a hollow cylindrical shape having a flute or groove 17 extending along the outer cylindrical surface parallel to the cylindrical axis of the body 16. This groove 17 has a concave arcuate profile as viewed in a cross section of the mandrel body 16, and the two parts at which the concave surface of this groove 22 and the cylindrical outer surface of the mandrel body 21 meet are rounded.

The mandrel body 16 has an interior chamber 18 which is closed at the lower end thereof as viewed in FIG. 2. An adapter (not shown) is mounted on the upper end of the mandrel body 16 and is connected by way of a pipe to a vacuum source and a compressed air source (both not shown).

On one hand, a plurality of through holes 20 extend through the wall of the mandrel body 16 and opening out of the surface of the groove 17, constitute communicating passages from the interior chamber 18 to the outside. Accordingly, when the interior chamber 18 is connected by way of the adapter and the pipe to the vacuum source, a plastic blank 10 wrapped around the mandrel is drawn closely against the outer surface of the mandrel. On the other hand, when the chamber 18 is connected to the compressed air source, the plastic sleeve 12 formed from the blank 10 on the mandrel is inflated. While in the example illustrated in the drawing, these holes 25 are shown as being circular holes, they may be in the form of slits.

In addition, a heat-seal strip 21 is embedded in the outer cylindrical surface of the mandrel body 16 at a position to one side of the groove 17. This heat-seal strip 21 is made of a thermally insulating material, preferably a teflon resin, and is disposed on the mandrel body 16 at a position to be in register with the aforedescribed overlap of the blank 10 so as to function cooperatively with the aforedescribed welder seam bar 13 in the heat sealing operation. A plurality of holes 22, 23 extend through the wall of the mandrel body 16 in two rows on opposite sides of the heat-seal strip 21.

According to this invention, a tensioning groove 24 is formed in the outer surface of the mandrel body 16 parallel to and spaced apart from the heat seal strip 21 on the side thereof opposite to the groove 17. The cross-sectional shape of this tensioning groove 24 is rectangular in the illustrated example, but it may have another suitable shape. However, an important feature of this tensioning groove 24 is that the total length of its cross-sectional profile or perimeter is longer than the length of the cross-sectional profile of the cylindrical outer surface of the mandrel body 16 extended across the opening of this tensioning groove 24. The significance of this feature will be apparent hereinafter.

On the radially outer side of the tensioning groove 24 in confrontal relation thereto is positioned a pressing-in bar 25 capable of being pressed into and extracted out of the tensioning groove 24. This pressing-in bar 25, which is caused by suitable means (not shown) to thus press the plastic film blank 10 into the tensioning groove 24 and subsequently release the blank 10, is made of a plastic material which will not damage the blank 10, such as, for example, a nylon resin. Furthermore, a holding plate 26 is disposed on the side of the holding groove 24 remote from the heat seal strip 21 in a confrontal relation to the peripheral surface of the mandrel body 16. This holding plate 26 is provided on its side confronting the mandrel body 16 with a rubber pad 27 bonded thereto and is also adapted to be advanced toward and into contact with the mandrel body 16 over the blank 10 and then away therefrom by suitable means (not shown).

The operation of each mandrel 11 of the above described construction will now be described with reference to FIGS. 3 and 4.

Figure 3:
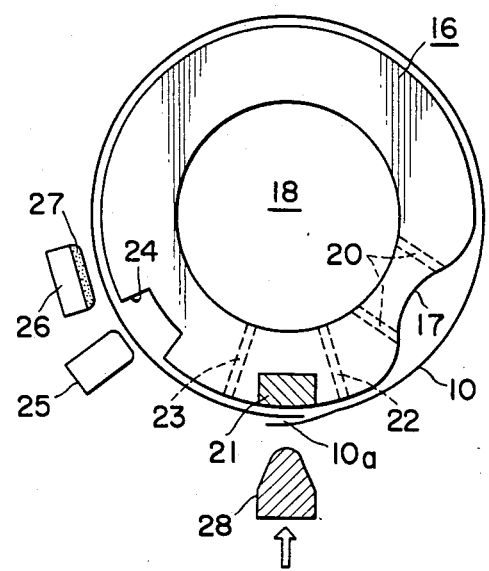
FIG. 3 is a cross-sectional view illustrating the relationship between the mandrel and a blank of plastic film at the time of heat sealing, when a vacuum is being applied to the inner surface of the blank.

As described hereinbefore, a blank 10 of a plastic film is cut off the web 1 by the knife 9, transferred by the transfer drum 8 to a corresponding mandrel 11, and wrapped around the cylindrical outer surface of the mandrel body 16 as shown in FIG. 3. In this state of the blank 10, the trailing edge part is overlapped over the leading edge part to form an overlap 10a as described hereinbefore.

In accordance with this invention, the interior chamber 18 is then connected to the vacuum source with the blank 10 in this state, whereby the holes 10, 22 and 23 are placed in communication with the vacuum source. Consequently, the blank 10 is drawn tightly against the outer surface of the mandrel body 16. The part of the blank 10 above the groove 17 of the mandrel body 16, particularly, is caused to adhere tightly against the concave surface of the groove 17. The overlap 10a of the blank 10 is positioned directly above and against the heat-seal strip 21. With the blank 10 in this position on the mandrel 11, the welder seam bar 28 is pressed against the overlap 10a to heat seal the overlap 10a and form the desired seam, whereupon the step of forming the plastic sleeve 12 is completed.

Then the interior chamber 18 of the mandrel is disconnected from the vacuum source and connected to the compressed air source. As a consequence, the pressure within the chamber 18 of the mandrel is changed from a negative value to a value exceeding the atmospheric pressure, and air is forced out through the through holes 20, 22 and 23. The plastic sleeve 12 around the mandrel body 16 is thereby inflated as shown in FIG. 4, and the inner diameter thereof becomes somewhat greater than the outer diameter of the mandrel body 16, whereby a small gap is formed between the sleeve and mandrel body. At this stage of the process, the overlap 10a of the plastic sleeve 12 is often adhering at a melted part thereof to the heat seal strip 21.

Figure 4:
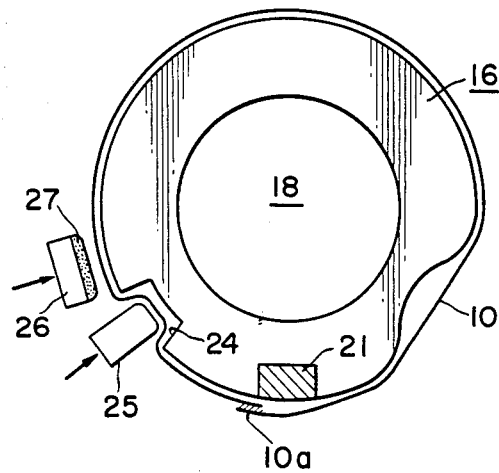
FIG. 4 is a cross-sectional view illustrating the relationship between the mandrel and the blank, which has now been fabricated into a sleeve, after the heat sealing step, and indicating the cooperative actions of a holding plate and the combination of a pressing-in bar and a tensioning groove to pull the sleeve sidewise relative to the mandrel and thereby to peel away and free any part of the sleeve which has melted during the heat sealing and is adhering to the mandrel.

Accordingly, as shown in FIG. 4, the holding plate 26 is pressed toward the mandrel body 16 to cause the rubber pad 27 to fixedly hold the plastic sleeve 12 against the mandrel body 16. The pressing-in bar 25 is then advanced toward the tensioning groove 24 so that the leading front part of the bar 25 contacts a part of the plastic sleeve 12 and presses that part into the tensioning groove 24. As a result, the plastic sleeve 12 at its portion on the side of the pressing-in bar 25 remote from the holding plate 26 is pulled and caused to shift sidewise (clockwise as viewed in FIG. 4) along the peripheral surface of the mandrel body 16, the overlap 10a thereby being caused to slide sidewise in the same direction, whereupon the melted and adhering part of the overlap 10a is peeled off the surface of the mandrel body 16. Then, by operating the stripper ring 14 with the sleeve 12 and the mandrel body 16 in this state, the plastic sleeve 12 can be easily stripped off the mandrel body 16.

While in the above described example, a groove 17 with a concave surface is formed in the outer peripheral surface of each mandrel body 16, this invention is not limited to this feature, it being applicable to modes thereof wherein no groove 17 whatsoever is used.

As will have been apparent from the foregoing disclosure, this invention provides a method of and device for fabricating plastic sleeves in which use is made of a mandrel with a mandrel body having a tensioning groove formed in its outer peripheral surface thereof and a heat seal strip embedded in its outer surface parallel to and spaced apart from the tensioning groove, and there are provided a pressing-in bar for pressing a part of a plastic sleeve wrapped around the mandrel body into the tensioning groove and subsequently releasing the same and a holding plate positioned near the tensioning groove on the side thereof remote from the heat seal strip and being operable to press the sleeve against the mandrel body while the pressing-in bar is thus operating, whereby the sleeve is caused to slide in the circumferential direction of the mandrel body, and any part of the sleeve which has melted and is adhering to the heat seal strip is easily peeled thereoff. As a result, the fabricated plastic sleeve can be very readily pulled off the mandrel body.

What is claimed is:

1. A method of fabricating plastic sleeves which comprises steps of:
   cutting a long web of plastic film into blanks of specific length;
   wrapping each blank around a cylindrical outer surface of a respective mandrel having a tensioning groove formed in the cylindrical outer surface thereof and extending parallelly to the cylindrical axis thereof, said tensioning groove having a cross-sectional profile of a total length which is longer than the length of the cross-sectional profile of said cylindrical outer surface extended across said tensioning groove, said specific length being such that the ends of the blank thus wrapped mutually overlap to form an overlap;
   applying a vacuum to the inner surface of the blank thus wrapped thereby to draw the blank tightly against the mandrel;
   pressing a welder seam bar against said overlap thereby to heat seal the same to form a seam and thereby to form a plastic sleeve;
   vitiating the vacuum;
   pressing and holding stationary a part of the sleeve against the cylindrical outer surface of the mandrel by means of a holding plate;
   simultaneously pressing the sleeve into the tensioning groove by means of a pressing-in bar thereby to pull the sleeve sidewise and peel away from the mandrel surface any part of the overlap which has melted and is adhering to the mandrel surface; and
   stripping the sleeve off the mandrel.

2. A device for fabricating plastic sleeves comprising:
   a mandrel body having a hollow interior and a cylindrical outer surface with a plurality of through holes communicating said interior and the atmosphere outside said surface for supporting a plastic film blank wrapped therearound with overlapped ends, said mandrel body having a tensioning groove in said outer surface disposed parallely to the cylindrical axis of the mandrel body and having a cross-sectional profile of a total length which is longer than the length of the cross-sectional profile of said cylindrical surface extended across said tensioning groove;

means for applying a vacuum to said interior to draw the blank tightly against said outer surface by suction through said holes during bonding together of the overlapped ends and for vitiating the vacuum thereafter;

bonding means for bonding together the overlapped ends of the blank thus supported on the mandrel to form a seam therealong and thereby form a plastic sleeve;

a holding plate movable against the mandrel body at a part thereof on one side of the tensioning groove remote from said bonding means for pressing and holding stationary a part of the plastic sleeve;

a pressing-in bar movable into said tensioning groove over the sleeve at the portion thereof spanning the tensioning groove;

means for moving said holding plate against the sleeve and for substantially simultaneously moving said movable pressing-in bar against another part of the sleeve and into said tensioning groove for drawing the sleeve sidewise in the circumferential direction of the mandrel body and thereby to peel and free any portion of the overlapped ends which has been caused by the bonding thereof to adhere to the mandrel body; and stripping means for stripping the sleeve thus formed and freed off the mandrel body.

3. A device for fabricating plastic sleeves according to claim 2 in which said bonding means comprises a heat seal strip embedded in said outer surface of a mandrel body strip, said blank being so positioned when thus wrapped around the mandrel body that said overlapped ends are in superposed alignment over said heat seal strip, and a welder seam bar movable into contact with the overlapped ends to press the same against the heat seal strip to accomplish fusion bonding together of the overlapped ends, and said holding plate having a part for contacting said sleeve made of an elastic material which cannot damage the sleeve.

* * * * *